("") 
(12) United States Patent  
Grenet et al.

(10) Patent No.: US 9,103,661 B2  
(45) Date of Patent: Aug. 11, 2015

(54) MEASUREMENT SYSTEM OF A LIGHT SOURCE IN SPACE

(75) Inventors: Eric Grenet, Neuchatel (CH); Peter Masa, Onnens (CH); Edoardo Franzi, Yverdon-les-Bains (CH); David Hasler, Neuchatel (CH)

(73) Assignee: CSEM CENTRE SUISSE D'ELECTRONIQUE ET DE MICROTECHNIQUE SA—RECHERCHE ET DEVELOPPMENT, Neuchatel (CH)

( * ) Notice: Subject to any disclaimer, the term of this patent is extended or adjusted under 35 U.S.C. 154(b) by 147 days.

(21) Appl. No.: 13/810,455

(22) PCT Filed: Jul. 14, 2011

(86) PCT No.: PCT/EP2011/062104  
§ 371 (c)(1),  
(2), (4) Date: Jan. 16, 2013

(87) PCT Pub. No.: WO2012/007561  
PCT Pub. Date: Jan. 19, 2012

(65) Prior Publication Data  
US 2013/0120763 A1    May 16, 2013

Related U.S. Application Data

(60) Provisional application No. 61/344,408, filed on Jul. 16, 2010.

(51) Int. Cl.  
*G01B 11/14* (2006.01)  
*G01C 3/08* (2006.01)  
(Continued)

(52) U.S. Cl.  
CPC .............. *G01B 11/14* (2013.01); *G01C 3/085* (2013.01); *G01D 5/34* (2013.01); *G01D 5/38* (2013.01); *G01S 1/70* (2013.01); *G01S 3/781* (2013.01); *G01S 3/7835* (2013.01)

(58) Field of Classification Search  
CPC ..................................................... G01B 11/14  
USPC ................................................. 356/621, 623  
See application file for complete search history.

(56) References Cited

U.S. PATENT DOCUMENTS 5,499,098 A * 3/1996 Ogawa .......................... 356/621  
5,563,408 A 10/1996 Matsumoto et al.  
(Continued)

FOREIGN PATENT DOCUMENTS

DE  2 012 1855   6/2003  
EP  2 169 357    3/2010  
(Continued)

OTHER PUBLICATIONS

International Search Report dated Apr. 23, 2012, corresponding to PCT/EP2011/062104.  
(Continued)

*Primary Examiner* — Roy M Punnoose  
(74) *Attorney, Agent, or Firm* — Young & Thompson

(57) ABSTRACT

A system measures the position of a light source in space using an imager and transparent surface with a pattern on top. The pattern consists of a repetitive pattern and a distinctive element. The system achieves sub-micron precision. It also handles the measurement of several light sources simultaneously, and the measurement of the position of a retroreflector instead of the light.

25 Claims, 16 Drawing Sheets

(51) Int. Cl.
*G01D 5/34* (2006.01)
*G01D 5/38* (2006.01)
*G01S 1/70* (2006.01)
*G01S 3/781* (2006.01)
*G01S 3/783* (2006.01)

(56) References Cited

U.S. PATENT DOCUMENTS

| | | | |
|---|---|---|---|
| 6,141,104 A * | 10/2000 | Schulz et al. | 356/616 |
| 6,717,662 B2 * | 4/2004 | Lange et al. | 356/121 |
| 6,737,652 B2 * | 5/2004 | Lanza et al. | 250/363.06 |
| 7,984,995 B2 * | 7/2011 | Morrison et al. | 353/121 |
| 8,017,899 B2 * | 9/2011 | Levenets et al. | 250/208.1 |
| 8,153,986 B2 * | 4/2012 | Mihailescu et al. | 250/370.1 |
| 8,519,343 B1 * | 8/2013 | Mihailescu et al. | 250/367 |
| 2002/0048017 A1 * | 4/2002 | Lange et al. | 356/121 |
| 2002/0075990 A1 * | 6/2002 | Lanza et al. | 378/2 |
| 2005/0069089 A1 * | 3/2005 | Armstrong et al. | 378/162 |
| 2005/0105101 A1 | 5/2005 | Duling et al. | |
| 2007/0258560 A1 * | 11/2007 | Armstrong et al. | 378/21 |
| 2009/0090868 A1 * | 4/2009 | Payne | 250/363.06 |
| 2009/0122958 A1 * | 5/2009 | Mihailescu et al. | 378/87 |
| 2010/0208245 A1 | 8/2010 | Leviton | |

FOREIGN PATENT DOCUMENTS

| | | |
|---|---|---|
| GB | 2 425 352 | 10/2006 |
| WO | 2006/107363 | 10/2006 |
| WO | 2010/112082 | 4/2009 |

OTHER PUBLICATIONS

R. Harley, et al.; "Multiple View Geometry in Computer Vision"; Cambridge University Press; 2003.

* cited by examiner

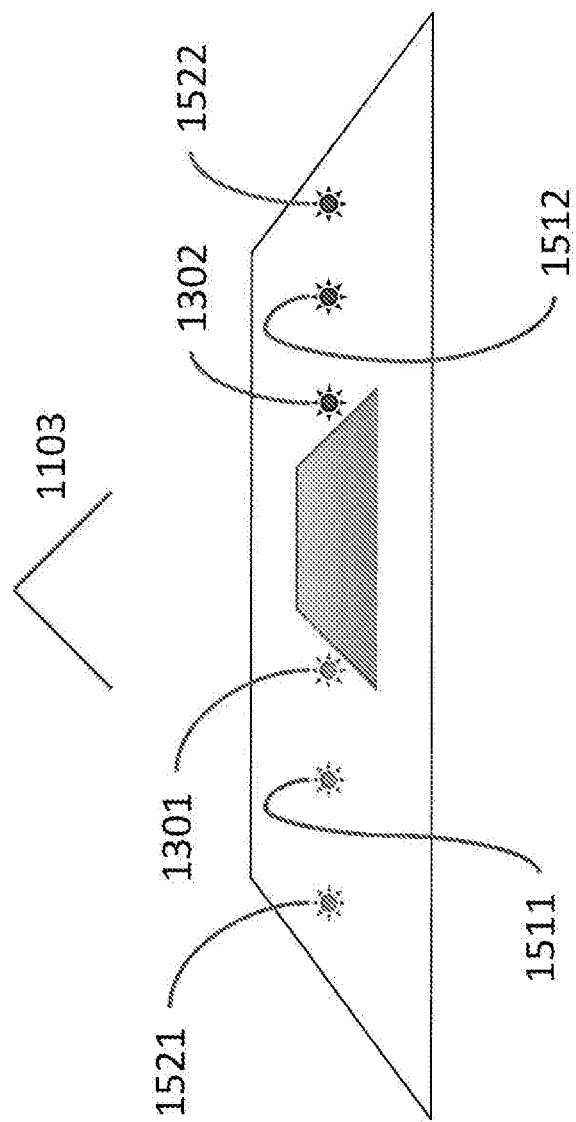

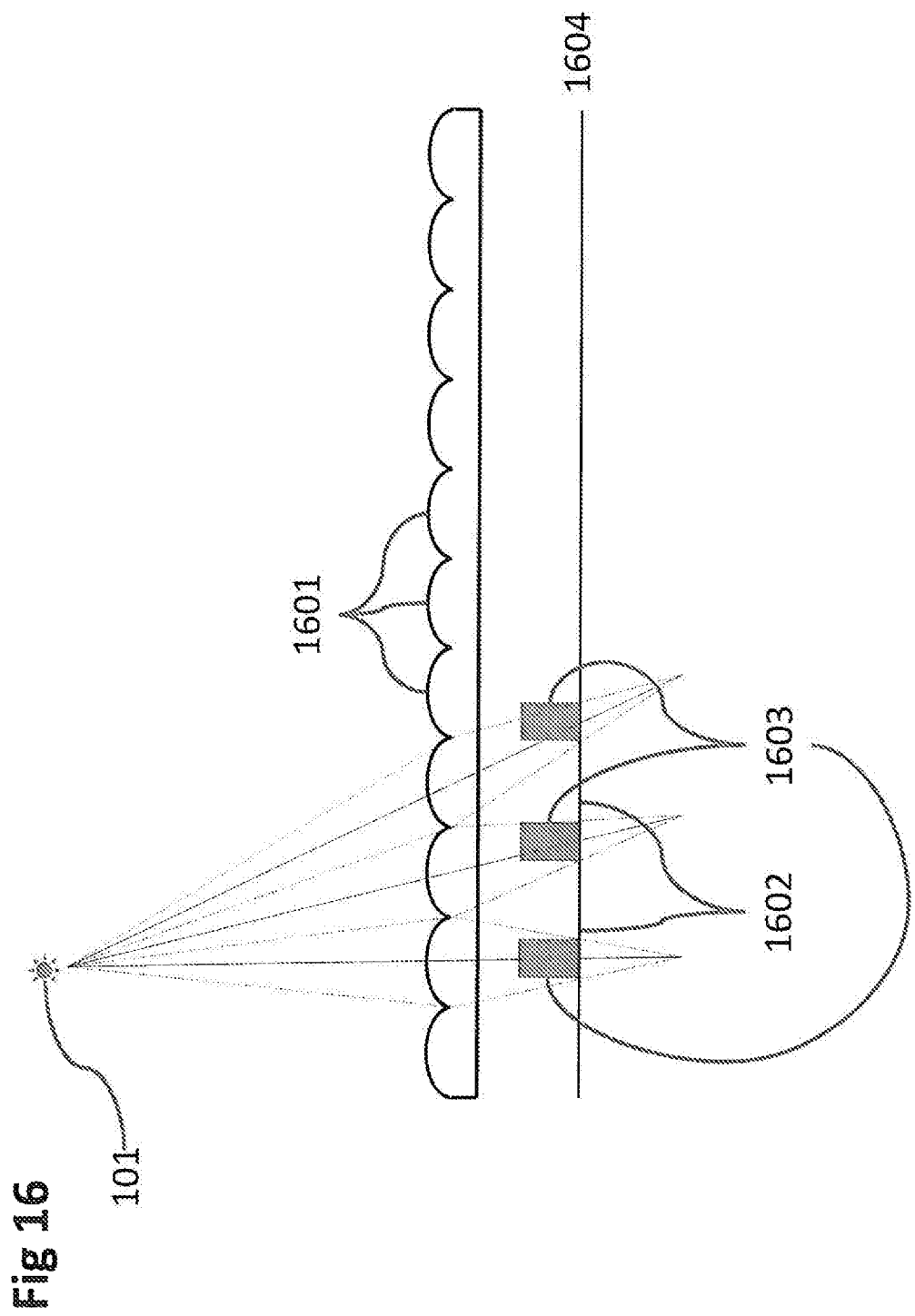

MEASUREMENT SYSTEM OF A LIGHT SOURCE IN SPACE

TECHNICAL FIELD

The present invention relates to the field of absolute positioning device, in particular to the field of three or more degrees of freedom measurement systems. Examples of such devices are pointing devices for computers or measuring devices for tooling. In particular, the present invention relates to the field of absolute positioning devices where the measured position ranges from a few nanometers to a few meters. It relates to positioning devices that measure the position of light sources in space.

BACKGROUND

Positioning devices are well known in the art, and are used across several technical domains. In the metrology domain, positioning devices are mostly found as rotary encoders, as in WO2006107363A1, or linear encoders as in U.S. Pat. No. 5,563,408. These encoders output a one-dimensional information about the position, and are operating with an excellent resolution—of the order of $1/10$ of a micron or of a $1/10,000$ of a degree. To reach a positioning with several degrees of freedom, these encoders can be part of a chain, for example in a robotic arm, with the disadvantage that the more encoders are used, the more the positioning resolution degrades. The state of the art of robotic arm positioning system has today a resolution, which is at best one micron. These encoders have in common the fact that the sensing element is measuring the position of a grating with respect to the sensing element. It implies that either the sensing element or the grating is attached to the object the position of which has to be measured.

More elaborate encoders, as disclosed in EP2169357A1, can measure precisely the two dimensional position of a camera with respect to a grating. These encoders are mostly targeted to X-Y positioning tables in the tooling industry, and can achieve sub-micron resolution.

In a different technical field, DE20121855U1 discloses a system to measure the position in space of an object carrying 3 light sources, by measuring the projection of a T-shaped device on a 2D sensitive area. The method suffers 2 major drawbacks: it does not explain how the system can work in a natural environment with several other light sources, and it has a limited precision. Indeed even if it would be possible to build a perfect device with infinite mechanical precision, the resulting measurement precision on the sensitive surface would be at best of the order of the wavelength, i.e. half a micron.

An object of the present invention is to alleviate the limitation of the prior art by disclosing a device that measures the position of one or several light sources in space, with a resolution that exceeds the wavelength by at least one order of magnitude while being robust to external illumination sources. In addition, the present invention is conceived for mass production, and can lead to a very economic system compared to the state of the art.

SUMMARY OF THE INVENTION

The disclosed invention is a measurement system that comprises at least one imaging device composed of a plurality of sensitive pixels disposed in at least one dimension; and at least one punctual light source; and at least one component—a grating or a microlens array—arranged to cast a shadow on the imaging device; the position of the component being fixed with respect to the imaging device. It also contains some computation means. The principle of measurement, for one light source, is the following.

Thanks to the light source, the component casts a shadow on the imaging device.

The imaging device records the image of the shadow.

The image of the shadow is used to compute the position of the shadow with respect to the component.

The position of the shadow is used to compute the elevation of the light source. For two-dimensional sensors, the position of the shadow is used to compute the elevation of the light source along the first and along the second dimension of the sensor.

By repeating this measurement in several distinct locations of the imaging device, and by combining the resulting elevations values, the three dimensional position of the light source can be obtained using well known triangulation rules.

To obtain the desired precision, it may be requested that the component that casts a shadow is composed of repetitive patterns. This repetitive property spreads the information of the light position over a large area on the sensor, and allows the system to break the fundamental precision limit associated to any device that measures a position based on a single measurement resulting from light propagation. In addition, the component can be advantageously realized as a grating on a planar surface and must include a distinctive element. The grating must contain parts that are transparent to the light and parts that are opaque to the light. The component can also be realized as an array of microlenses realized on a planar surface. The planar property brings the advantage of a simple elevation computation and a simple fixation over the imaging device. The grating can be printed using a standard lithography process, and the microlens array can be produced by hot embossing. The shadow of the component, recorded by the imaging device, must exhibit the repetitive patterns and the distinctive elements. The position of the shadow is computed using the position of the distinctive element, and is refined using the positions of the repetitive patterns. This refinement in the position is very important and gives an excellent precision to the device. Without the precision given by this refinement in the position, the device would be of very little practical use.

BRIEF DESCRIPTION OF THE DRAWINGS

The invention will be better understood by reading the following description, provided in reference to the annexed drawings where:

FIG. 15 shows how to adapt the position of the light sources to increase the retroreflector position estimation precision; and FIG. 16 shows the embodiment of FIG. 7 illustrating reception of light from a light source.

DETAILED DESCRIPTION OF THE INVENTION

Figure 1:
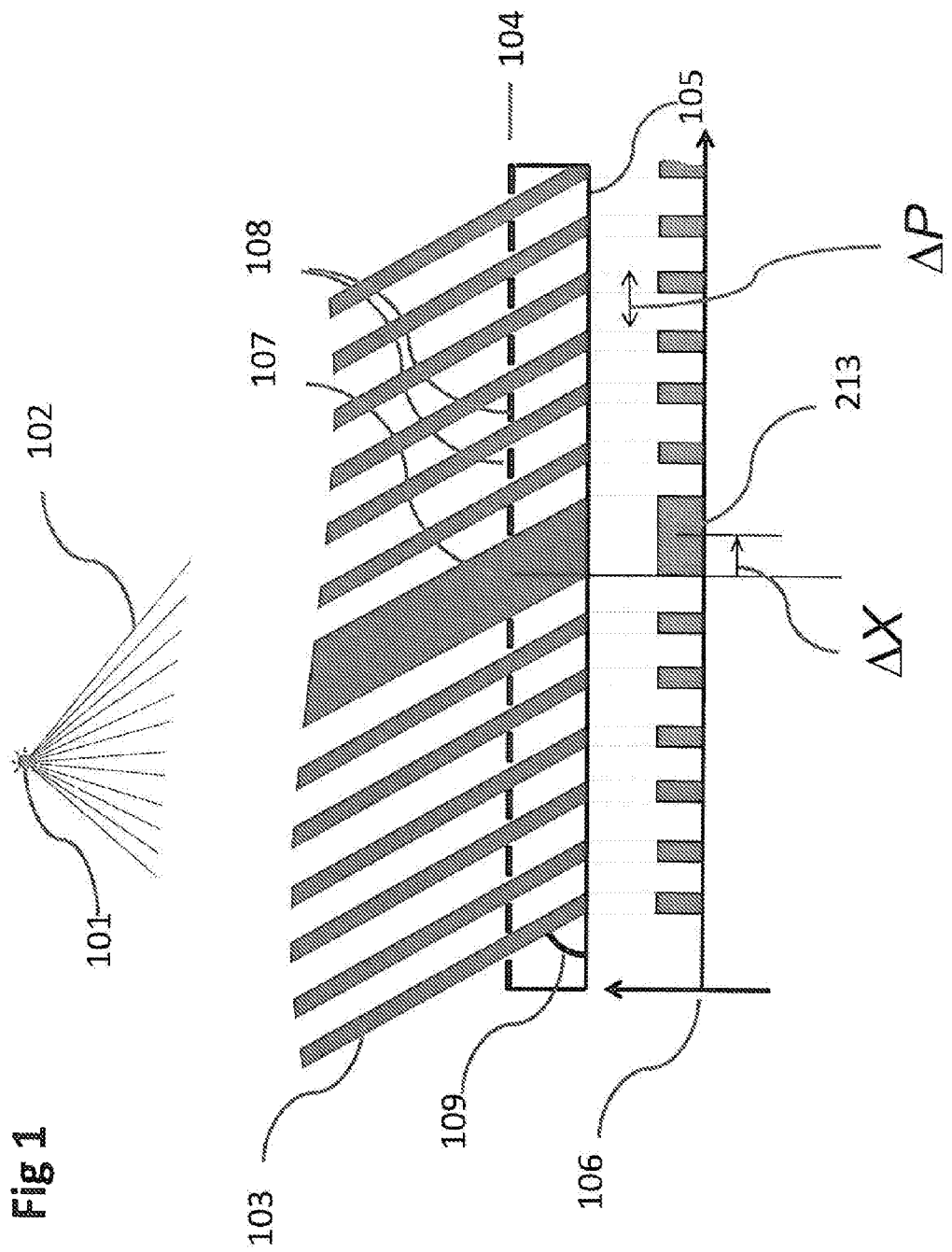
FIG. 1 shows the principle of the elevation measurement.

In the following description, we will first present the measurement system based on a single point light source, a one-dimensional imager and a component arranged to cast a shadow on the imager. In a first example, this component will be a one-dimension grating. Then we will present how this system can be extended using a two dimensional sensor, using more than one light source and finally how to handle light sources from the ambient illumination.

A light source 101 produces light rays 102, which can be considered as being locally parallel rays 103 in the sensor proximity. A grating 104 is used to let only part of the light reach the sensor 105. A sensor records the shadow pattern 106, which is an approximate replica of the grating 104. The grating contains repetitive elements 108 and a distinctive element 107, which in this example is just a lack of one of the repetitive elements.

Computation means are used to compute the displacement $\Delta X$ of the shadow with respect to the grating. Using the knowledge of the measurement systems dimensions, it is straightforward to compute the elevation. The elevation is shown by the angle 109 in FIG. 1.

The computation of $\Delta X$ is performed as the sum of an approximate position computed from the distinctive element and a phase position computed from the repetitive patterns. By using well known methods, for example correlation, one can compute an estimate $\hat{\Delta X}$ of the position $\Delta X$. Then, $\Delta X$ can be expressed as a multiple of the distance from one repetitive pattern to the next $\Delta P$ (on the image of the shadow) plus a phase distance dX:

$$\Delta X = n \cdot \Delta P + dX \quad (1)$$

n is then chosen to minimize the absolute value of the difference $(\hat{\Delta X} - \Delta X)$. The phase distance dX is computed using this formulation $$\begin{cases} A = \sum_x \sin\left[\frac{2\pi}{\Delta P} M \cdot x\right] \cdot s(x) \\ B = \sum_x \cos\left[\frac{2\pi}{\Delta P} M \cdot x\right] \cdot s(x) \\ dX = -a\tan 2(A, B) \cdot \Delta P \end{cases} \quad (2)$$

Where M is the pixel pitch, s(x) is the shadow pattern 106 recorded by the camera, x the pixel coordinate and a tan 2(A,B) the arctan(A/B) function defined in $-\pi,\pi$. Depending on the choice of the coordinate system, on whether $\Delta X$ represents the position of the shadow with respect to the imager or vice-versa, the sign of dX can change. Also, depending on the encoding of the shadow—the shadow can be encoded as a large or as a small value depending on the imager—the value of dX can shift by $\Delta P/z$. The man skilled in the art will have no difficulty to set these parameters by trial-and-error. The closer the light source is, the larger the $\Delta P$ value is. In practice, $\Delta P$ can be measured by correlating the shadow image with itself, and finding the distance to the first correlation peak.

To obtain an excellent precision, it is important, but not mandatory, that the sums of equation (2) are performed on complete sine and cosine periods. For example, the x range can be set from 0 to a multiple of $M/\Delta P$ minus one. It also implies that the pixel pitch of the imager may preferably divide the distance from one repetitive pattern to the next, i.e. $\Delta P/M$ may preferably be an integer.

Figure 2:
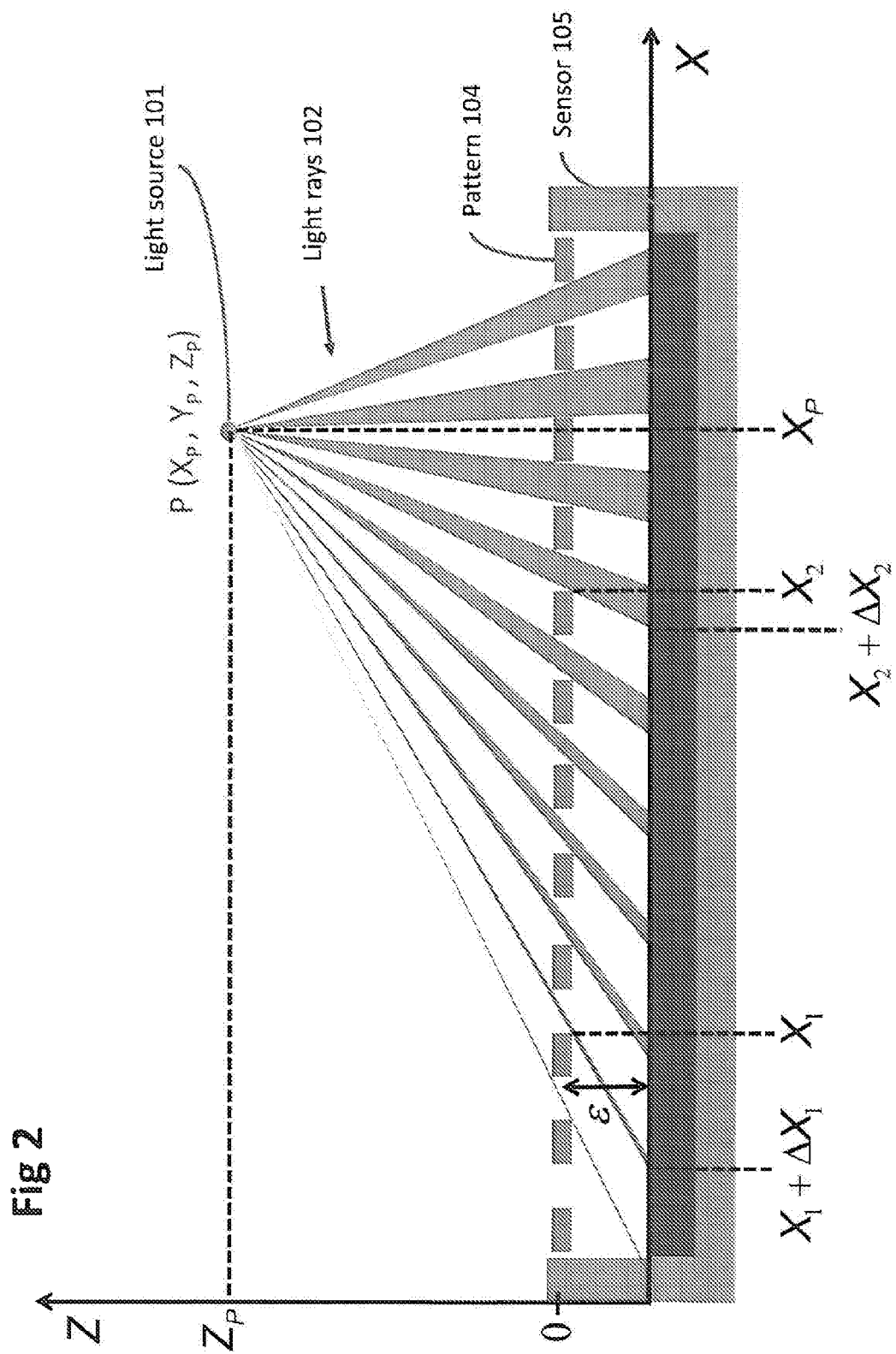
FIG. 2 shows an example of computation of the distance of the light source to the sensor plane.

To obtain the vertical distance Z of the light source from the sensor, measured perpendicularly from the sensor surface, it is possible to compute two (or more) elevation values, from two (or more) distinct locations of the imager, and combining those to obtain the distance Z. For example, in FIG. 2, the distance $\Delta X$ is computed in two locations, and result in $\Delta X_1$ and $\Delta X_2$. The resulting position P of the light source is computed as $$\begin{cases} X_p = \frac{X_2 \cdot \Delta X_1 - X_1 \cdot \Delta X_2}{\Delta X_1 - \Delta X_2} \\ Z_p = \varepsilon \cdot \frac{X_p - X_1}{\Delta X_1} \end{cases} \quad (3)$$

The distance Z can also be computed by computing the magnification of the shadow pattern with respect to the pattern realized on the component; for a grating it means computing a value $\Delta P$ on the shadow and a value $\Delta P_2$ on the grating and, and comparing the two values:

$$Z_p = \varepsilon \cdot \frac{\Delta P_2}{\Delta P - \Delta P_2}$$

The grating can be made with a chromium-plated glass. The light is blocked at the locations where chromium is deposited, and can go through the glass elsewhere. The preferred embodiment is the one using opaque regions and holes for implementing transparent regions. For example a grating made of nickel and holes may be used. Today Nickel plates can be manufactured at low cost, with thicknesses around 30 microns, and with an accuracy of the holes of one micron over a couple centimeters. It is preferred to implement transparent regions by holes instead of by glass, because the light goes straight through the holes, while it is slightly deviated by a glass layer, according to Snell's law.

To compute the three-dimensional position of the light source 101 using a one-dimensional imaging device, we need M imaging devices, and M components, where M is greater or equal to two. Each component is attached between the light source and its respective imaging device, the relative position between each imaging-component couple being fixed and defined. The imaging devices are non-coplanar.

When M is equal to 2, equation (3) is applied for every imaging device, and defines a line in space (because only two dimensions are fixed by equation 3). The point closest to the two lines computed for the two imaging devices being the position of the light source 101.

Figure 3:
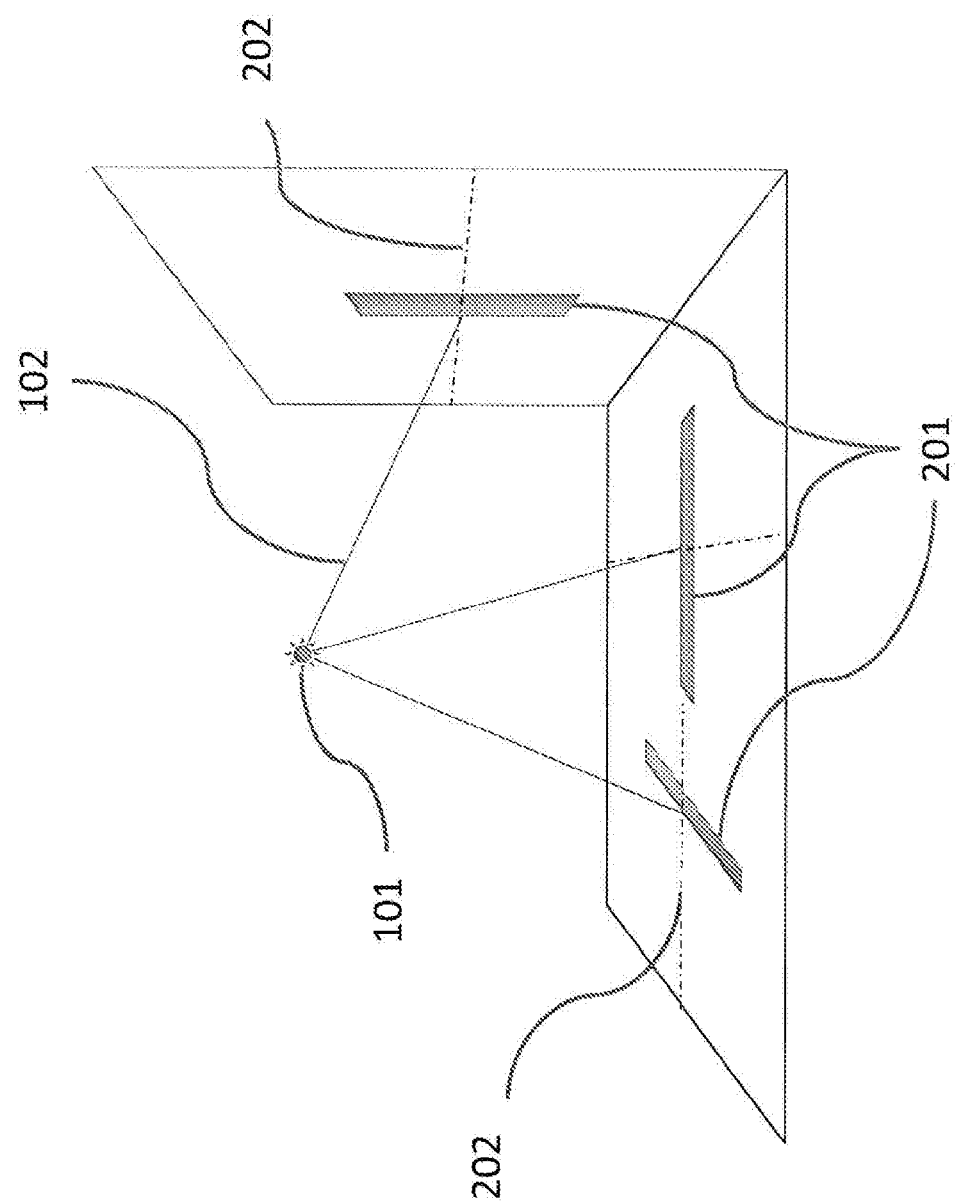
FIG. 3 shows the use of three one-dimensional sensors to compute the position of a light source.

FIG. 3 shows an example setup, where the three dimensional position of a light source 101 is computed from 3 linear devices. There are three linear sensors 201, disposed in a non-coplanar fashion, and preferably disposed perpendicular from one to another. The elevation is computed for each sensor. The elevation value defines a plane in space for every sensor, which is depicted by the light ray 102 and the intersection of said plane with the sensor plane 202. The position of the light source 101 is the intersection of these 3 planes. These 3 planes intersect in a single point if the sensors are not coplanar.

When there are more than three linear devices, the position of the light source 101 is chosen to be the one closest to every plane derived from the elevation computed for every linear device. By closest we mean the one whose sum of the distance to every said plane is minimum.

The invention can be carried out advantageously using two-dimensional imaging devices. With a two-dimensional imaging device, and by computing the position of the shadow along the lines and along the columns, the system can compute the elevation of the light source along the lines and the elevation of the light source along the columns from the repetitive patterns and from the distinctive element present in the image delivered by the two-dimensional imaging device. To get the best possible precision, the computation of the elevation should use most of the pixels that record said image of the shadow in the area used for the estimation of the elevation values. By most we mean at least 80%, preferable 90% and mostly preferably 100% of the pixels. In other words, in the example that uses 100% of the pixels, if the value of one single pixel varies, the elevation along the lines, or the elevation along the columns (or both) will also vary. The implementation according to Equation (1) and Equation (2) follows this principle: it uses every pixel value in the refinement of the position estimation. For a given physical setup, the precision limit will be given by the shot noise, which decreases with the number of photons recorded by the imaging device. It is thus important to use as many pixel values as possible in the computation to obtain an excellent precision. Note that using 100% of the pixels in an implementation that computes the elevation along the lines and the elevation along the column may mean using 50% of the pixel for the computation of the elevation along the lines and the other 50% of the pixels for the computation of the elevation along the columns. This splitting of the pixels reduces the computation complexity and does not reduce the final precision as long as every considered pixel is used in the overall computation. The splitting of the pixels should be balanced, in other words, when splitting 100% of the pixel, 50% (±5%) must be used along the columns and the other 50% (±5%) must be used along the rows (the sum of both percentages must sum up to 100%). When splitting 80% of the pixel, 40% (±5%) must be used along the columns and the remaining 40% (±5%) must be used along the rows (the sum of both percentages must sum up to 80%).

Figure 4:
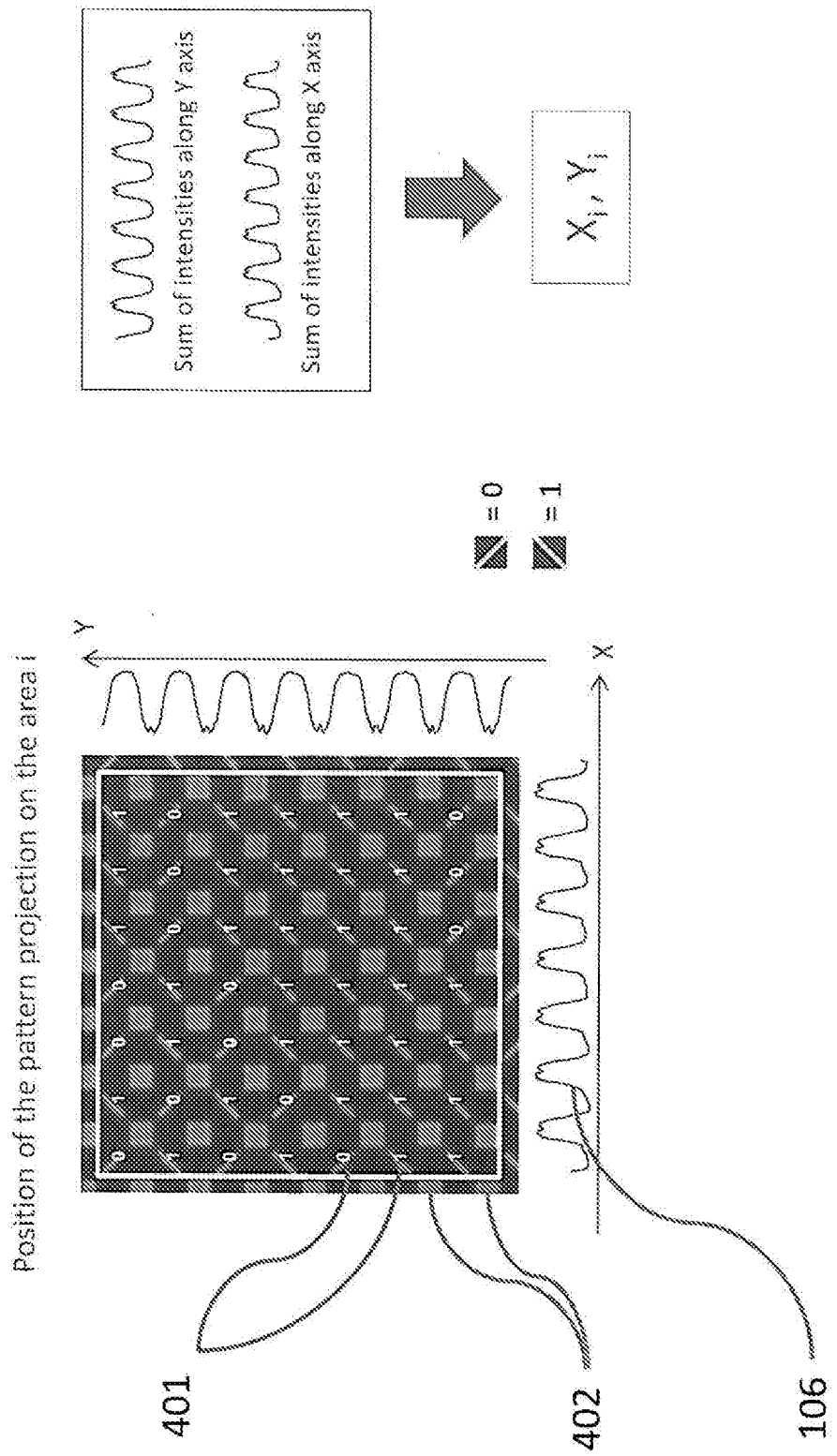
FIG. 4 shows the computation of the position of the shadow in two dimensions.

FIG. 4 shows the image of a grating taken by a two-dimensional sensor. The distinctive element is the set of diagonal lines 401, the repetitive pattern is a square 402. The grid of repetitive pattern is aligned to the grid of pixels of the sensor. The elevation of the light source along the lines of the sensor is obtained by computing the sum of the pixel values over the lines of the image, and by using the resulting signal 106 as in the one-dimensional case. The elevation of the light source along the columns of the sensor is obtained in a similar manner by summing the pixel values over the columns of the image.

Figure 5:
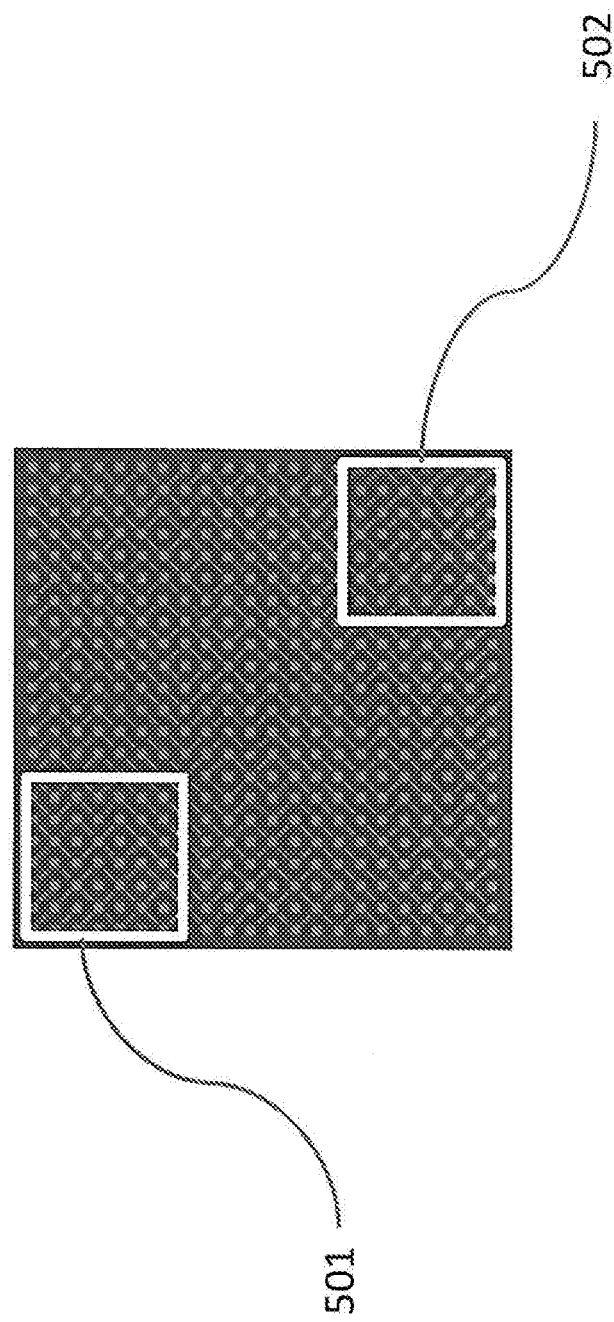
FIG. 5 shows the split of the sensor into two zones for implementation of the triangulation.

FIG. 5 shows an example of using a single sensor for measuring the three dimensional position of the light source. The image is separated into two zones 501 and 502 by the computation means. By computing the position of the shadow with respect to the grating in each zone, the elevations values along both dimensions are computed. These elevations values are combined to compute the three-dimensional location of the light source: each zone defines a line in space where the light source is located. This line crosses the center point of each zone (501 or 502). Ideally, the light source location is the intersection of these two lines. Practically, because of measurement noise, these lines do not intersect. The position of the light source is estimated as the location in space that is the closest to both lines. In other words, the sum of the distance from said location to every line is minimal.

Figure 6:
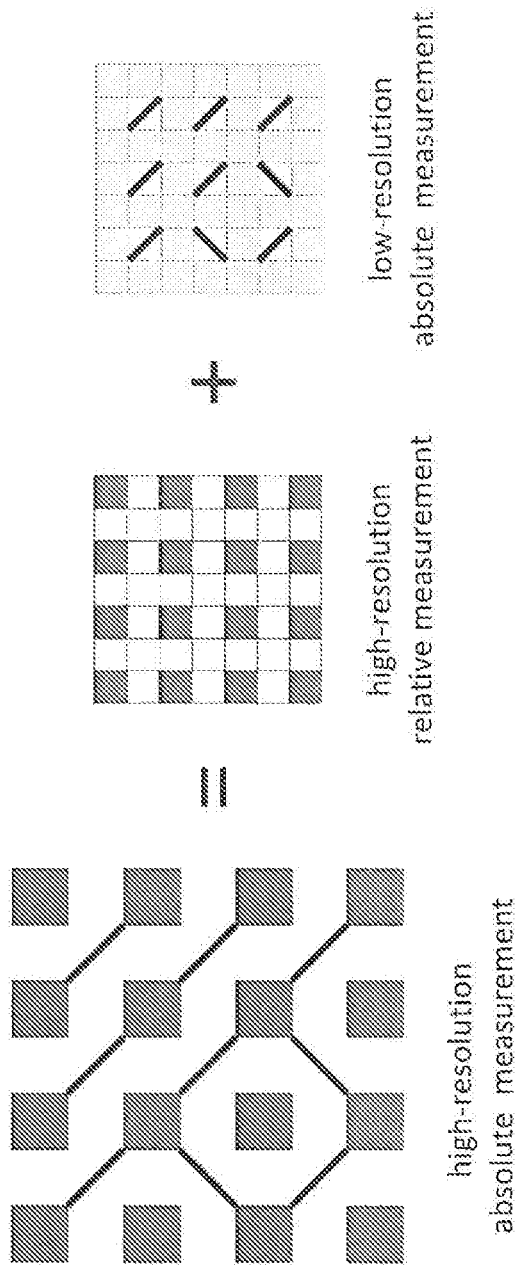
FIG. 6 shows an embodiment of the two-dimensional grating printed on the surface above the sensor with an interlaced absolute code.
Figure 7:
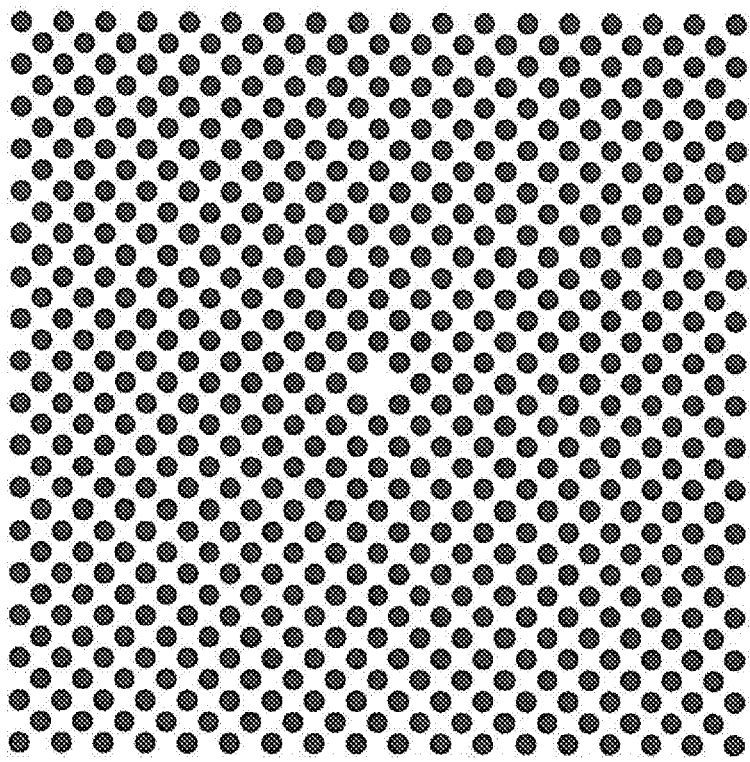
FIG. 7 shows an embodiment of the two-dimensional component realized on the surface above the sensor with one missing pattern as distinctive element.
Figure 8:
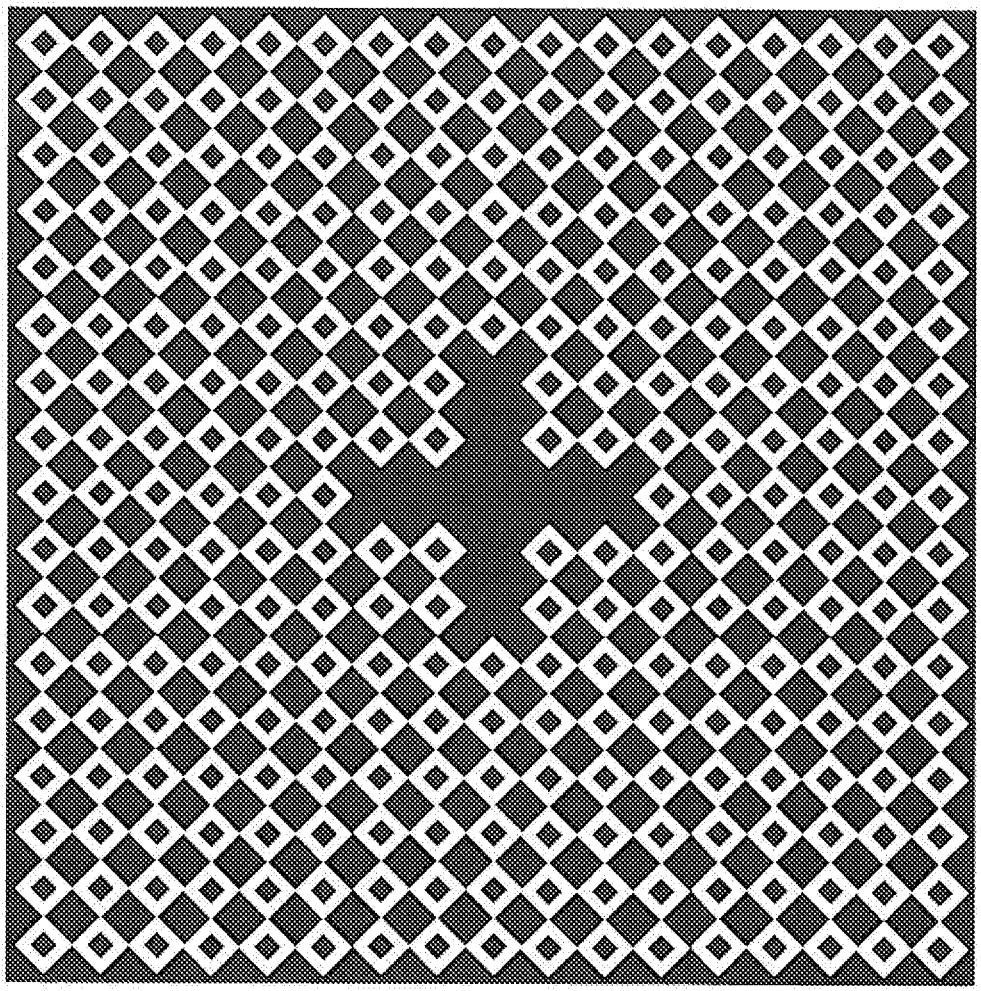
FIG. 8 shows an embodiment of the two-dimensional grating printed on the surface above the sensor with a cross as distinctive element.

In some embodiments, the position of the distinctive element is computed from the signal resulting from the sum over the lines and columns of the images, for example with the patterns of FIGS. 7 and 8. In other embodiments, only the phase distance dX is computed from said signals; the estimate of the absolute position ($\Delta X$) being computed directly on the picture, as in the example of FIGS. 4 and 6. To function properly, the sum over the lines and over the columns may exhibit a repetitive pattern. Preferably, the repetitive pattern may be repeated at regular space intervals, and have always the same shape and size, as in the examples of FIGS. 6 to 8. FIG. 6 shows an example of a grating that uses a two-dimensional code as distinctive element, as described in EP2169357A1, which is interlaced with the repetitive patterns. Diagonal lines represent the elements of the code: a diagonal at 45 degree represents a 1 and a diagonal at −45 degrees represents a 0. The code is characterized in that any squared subset of the code, which contains at least three by three elements of the code, is unique. In other words, it means that any sub-image that contains at least three times three (3×3) elements of the code can be used for the computation of the position of the shadow. The advantage of using such a code is that the distinctive element is always present, no matter what part of the grating is used. This confers some flexibility to the system, even if such an interlaced code is a slight degradation in the precision of the position compared to solutions that use the grating of FIG. 7 or 8. In addition, the code must be read directly from the image, and cannot be read from the sum over the lines or columns.

In another embodiment of the invention, the element of FIG. 7 can be implemented using a microlens array. In other words, the component pattern is a microlens and the distinctive element is a missing microlens region. Each black dot represents the position of a micro-lens. The microlenses are more expensive to produce than a conventional grating, but generate a shadow pattern, which has more light, and thus allows for a faster measurement system. In addition, the diffraction phenomena, also known as Talbot effect, have a substantially smaller influence on the shadow pattern. This last advantage allows for more flexibility in the choice of the distance between the element and the imaging device. If for some technological reasons, the microlens array cannot have a missing microlens in the middle of the array, it is possible to use a regular and complete rectangular microlens array, of a size that does not cover completely the imaging device; the distinctive element is thus embodied by the border of the microlens array. The embodiment is also shown in FIG. 16, with microlenses 1601, that generate light on the imaging device 1604 in positions 1603, and shadow in positions 1602.

In another embodiment of the invention, the system measures the three dimensional position of two punctual light sources emitting light at distinct wavelengths, by using two filters. One of said filters is opaque at the wavelengths of one light source, and transparent at the wavelength of the other light source, and vice versa for the other of said filters. Preferably, the light sources are monochromatic and each filter is transparent only at the wavelength of its associated light source. In practice, a filter is never 100% opaque or 100% transparent; the filters are chosen such as to maximize its transparency for one light source while maximize its opacity for the other light source, respectively. The filters that implement this trade-off are said to be matched to the wavelengths of the light sources. The filters are arranged so as to cover distinct locations of the component, and in that each filter covers a surface, which is at least as big as nine times the surface of a single pattern of the component. By "filter" we refer to the optical property of the material that embodies the surface used for filtering the light. According to this definition, we can place the same filter on different distinct location of the sensor.

Figure 9:
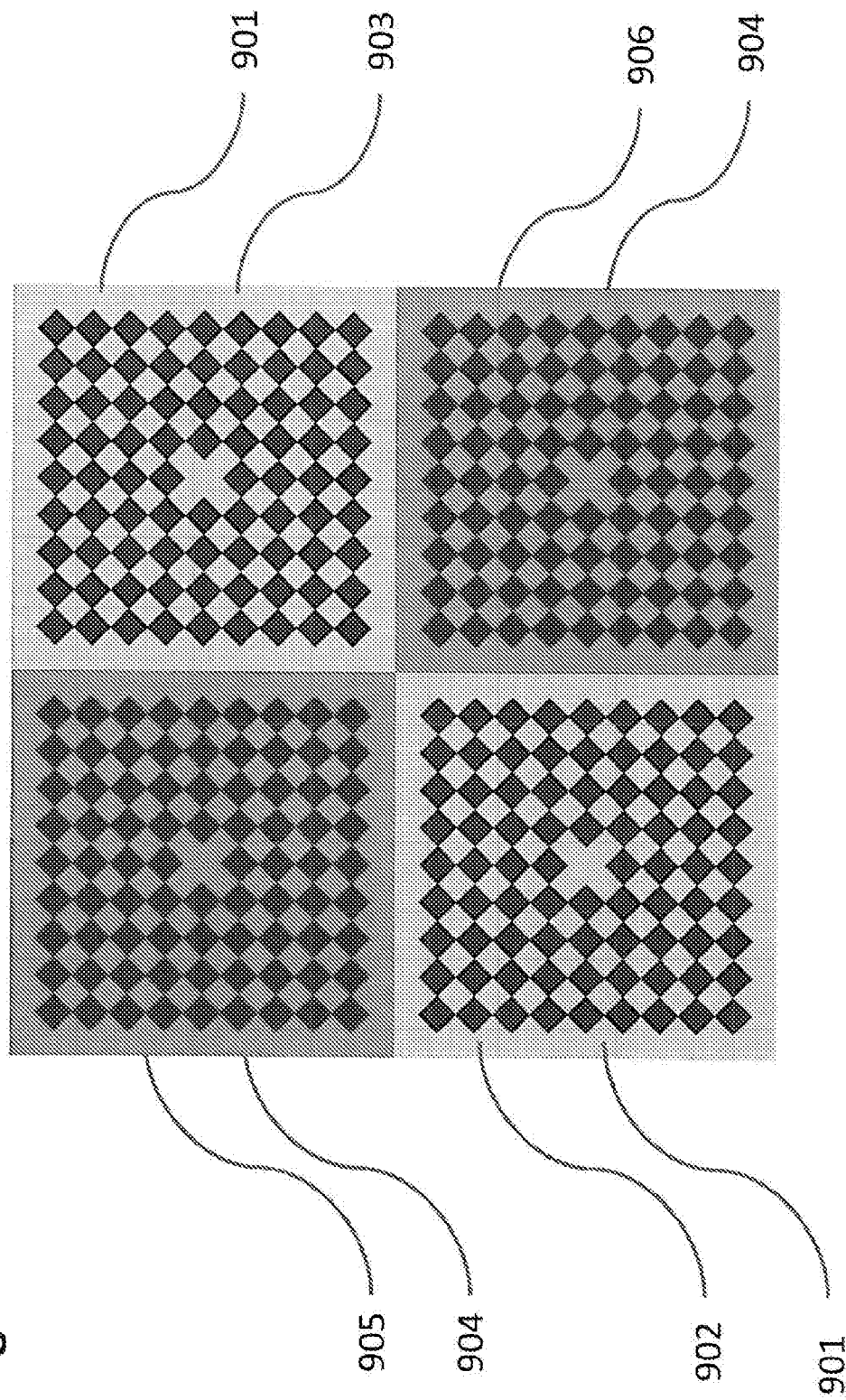
FIG. 9 shows the use of filters to measure the three-dimensional position of two light sources simultaneously.

FIG. 9 shows a system with two filters 901 and 904. The filter 901 covers two areas 902 and 903 of the sensor, while filter 904 covers two other areas 905 and 906 of the sensor. Every area under the filter is treated as a separate image by the computation means. The computation of the elevation of the light source along the first dimension and along the second dimension is performed separately for each filter areas 902, 903, 905 and 906, by taking the corresponding image and performing the computation as described before. The elevations value of areas 902 and 903 are used to compute the position of the first light source, while the elevations values of areas 905 and 906 are used to compute the position of the second light source.

Figure 10:
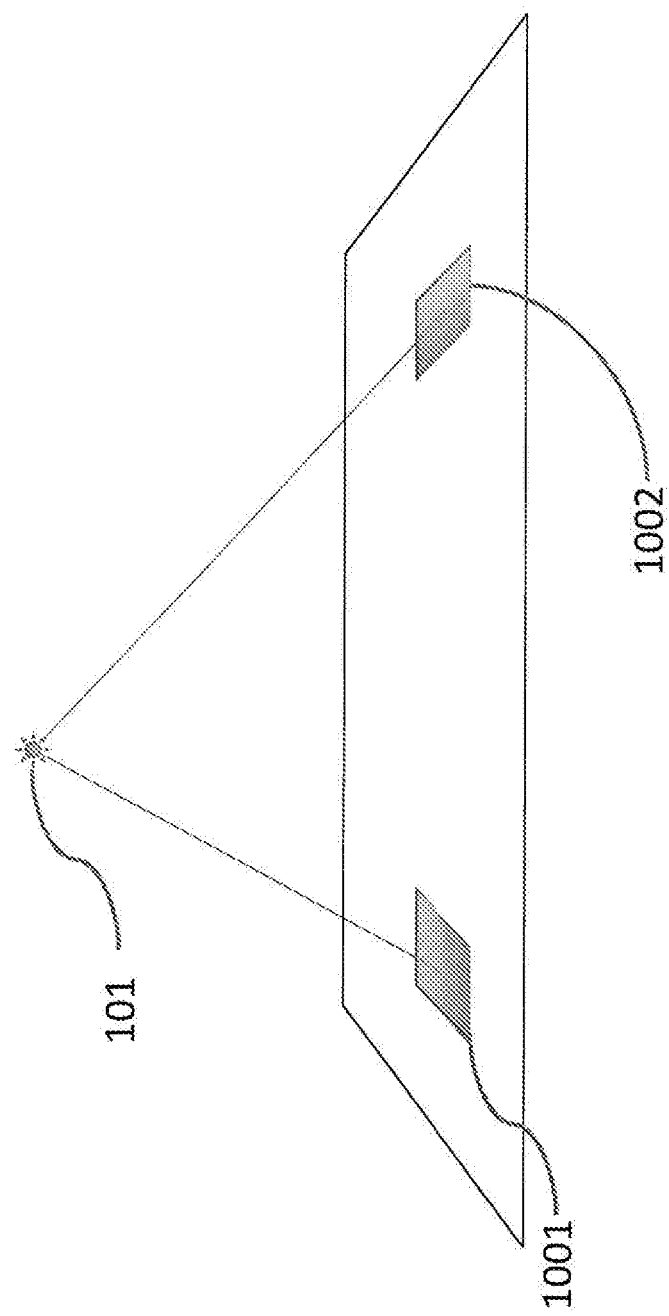
FIG. 10 shows an embodiment using two sensors to compute the position of a light source.
Figure 11:
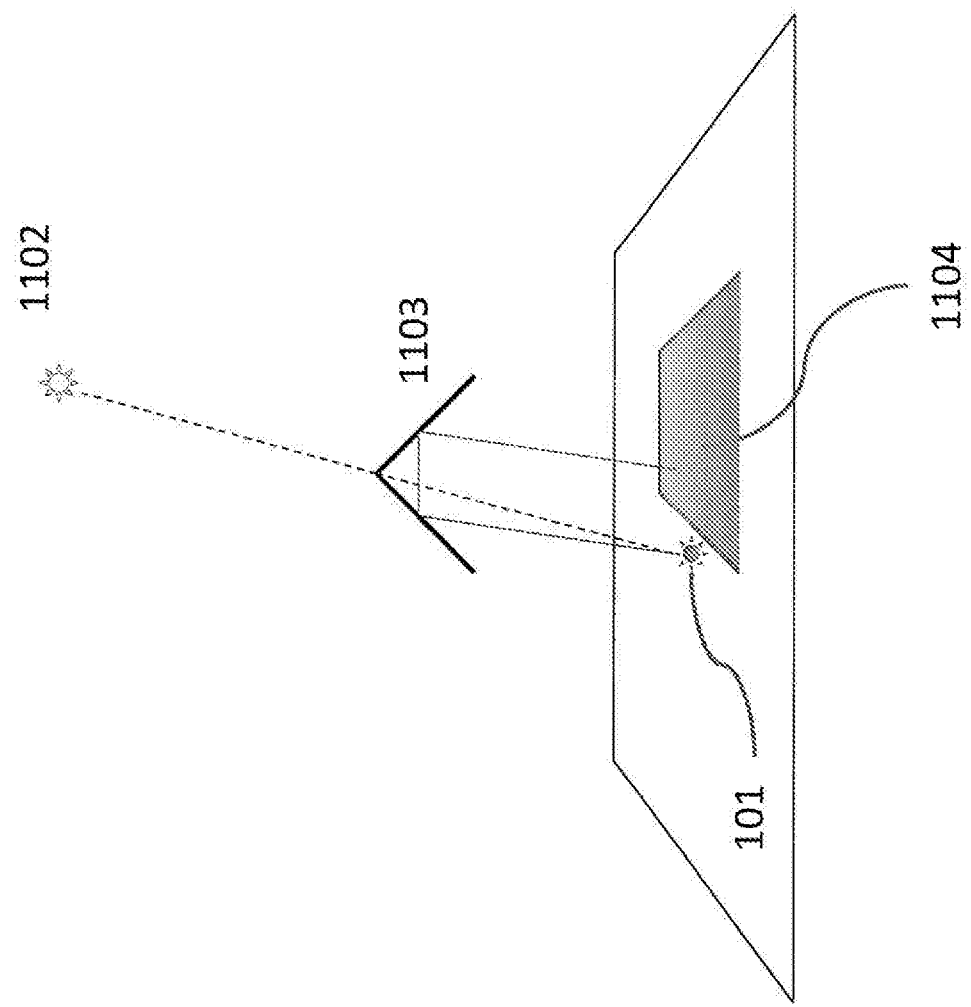
FIG. 11 shows the principle of the computation of a retroreflector position using a virtual light source position
Figure 12:
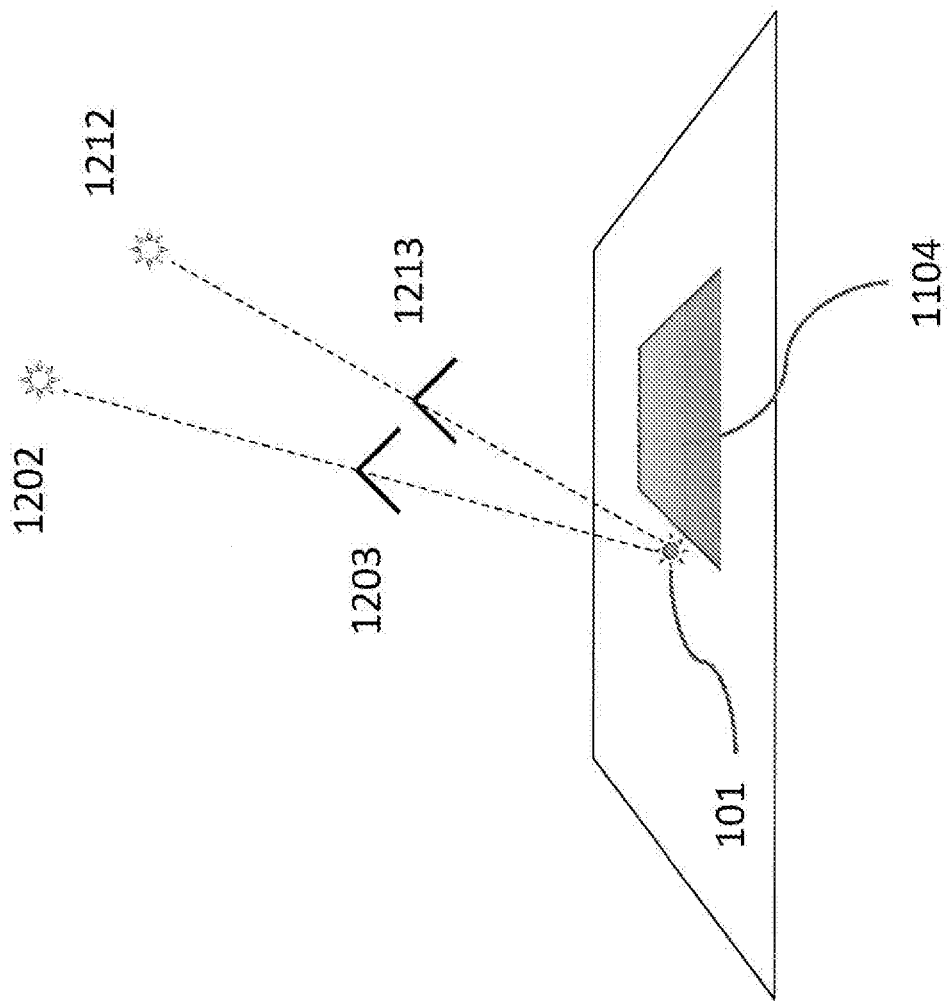
FIG. 12 shows the computation of the position of two frequency selective retroreflectors.

To increase the precision of the measurement in the third dimension, that is, in the dimension perpendicular to the measuring device, the distance between the measurement zones 501 and 502 must be increased. This is done in an equivalent way in another embodiment of the invention shown in FIG. 10, by using two (or more) distinct measurement devices 1001 and 1002 instead of only one. Each device 1001 or 1002 is composed of an imaging device and a component, which is attached between the light source and its imaging device. As described before, the relative position between the imaging device and its component is fixed and defined. Devices 1001 and 1002 share the computation means that are designed to compute the three-dimensional position of the light source. By computing the position of the shadow along the lines and along the columns, the computation means compute the elevation of the light source along the lines and the elevation of the light source along the columns from the repetitive patterns and from the distinctive element present in the image delivered by the two-dimensional sensor for every device 1001 and 1002. These elevations values define two lines in space. The point that is the closest to these two lines is the three-dimensional position of the light source. The measurement system of FIG. 10 can be implemented using an arbitrary number (>1) of imaging-component couple: the position of the light source being estimated as the point in space whose sum of the distance to every line resulting from an imaging-component couple is minimal.

In another embodiment of the invention, the system measures the position of two or more light sources by temporal modulation. The light sources are switched on and off according to a predefined temporal sequence. For example, for two light sources, the time can be divided in three periods p1, p2 and p3. The first light is switched on during period p1 and switched off during periods p2 and p3; the second light source is switched on during period p2 and switched off during periods p1 and p3. At the sensor side, the computation means can detect when all the lights are switched off, and thus synchronize itself with the light sources. Then, these computations means perform a position estimation during period p1, which correspond to the position of the first light source, and perform a position estimation during period p2, which correspond to the position of the second light source. The image taken during period p3 is not influenced by the light sources the position of which has to be measured. Hence, the image recorded during period p3 can be subtracted from the images taken during period p1 and p2, resulting in a new image, which is used as replacement of the image of the shadow for the computation of the position. This last computation can mitigate the influence of spurious light sources in the scene on the estimation of the position of the light source of interest.

This principle can be extended to an arbitrary number of light sources, the temporal multiplexing of signals, as shown as example here, is well known in the field of telecommunications. In particular, it can also be extended to a single light source, which is switched on and off, to mitigate the effect of spurious light sources in the environment.

In another embodiment of the invention, the light source is modulated using a modulation circuit. For example, the light source can be advantageously modulated to deliver a luminance L, which follows a sinusoidal law $$L = P + Q \cdot \sin(2\pi \cdot f \cdot t)$$

where t is the time, P and Q are constants, and f is the modulation frequency of the light source. P must be greater or equal to Q, preferable slightly greater than Q. On the receiver side, that is, on the imaging device side, three images can be taken at times $t_1$, $t_2$ and $t_3$ resulting in images $I_1$, $I_2$ and $I_3$, where $$\begin{cases} t_2 = t_1 + \frac{1}{f}\left(\frac{1}{3} + n\right) \\ t_3 = t_1 + \frac{1}{f}\left(\frac{2}{3} + m\right) \end{cases}$$

and where m and n are arbitrary integer constants, but preferably equal to 0. By taking the sum of the image $$I_s = \frac{1}{3}(I_1 + I_2 + I_3)$$

we get an image which averages out the modulation. This new image $I_s$ can be subtracted from images $I_1$, $I_2$ and $I_3$. The new image considered for the computation of the three-dimensional position of the light source is $$I_n = |I_1 - I_s| + |I_2 - I_s| + |I_3 - I_s|.$$

Image $I_n$ is guaranteed to be non-zero, independently of the choice of $t_1$. In other words, the measuring device only needs to know the oscillation frequency f, but does not need to be synchronized with the light source modulation. In addition, the new image $I_n$ is independent of any non-oscillating light source in the environment. By choosing f and m, n, appropriately, the new image $I_n$ can be made independent of a background light source oscillating at 100 Hz or at 120 Hz. For example, to be independent of a light source that oscillates at 100 Hz in the background, $(t_2-t_1)$ must be a multiple of 1/100 second, and $(t_3-t_1)$ must also be a multiple of 1/100 second. Preferably, the oscillation frequency f is set to a multiple of 3 times the background frequency. To be independent of a light source that oscillates at 120 Hz in the background, $(t_2-t_1)$ must be a multiple of 1/120 second, and $(t_3-t_1)$ must also be a multiple of 1/120 second. 100 Hz and 120 Hz are particularly important frequencies, because the incandescent light sources oscillate at twice the frequency of the power lines, which is set to 50 Hz or 60 Hz in most of the countries.

In another embodiment of the invention, the light source 101 is connected to the computing means and to the imaging device. By connected, we mean that there is at least one electrical connection between the computing means, the imaging device and the light source. For example, the light source can be placed next to the imaging device on the same circuit, or even in the middle of the imaging device. This configuration requires only one power supply, and allows for a very convenient synchronisation between the image capture and the light emission. For example, it is easy to switch on the light, take and image, switch off the light take another image, and combine both images to mitigate the influence of spurious lights in the environment. In this embodiment, a retroreflector 1103 is used to reflect the light back to the light source and to the sensor. A retroreflector is an optical element that reflects any light ray back in a direction, which is parallel to the incident direction, independently of the orientation of the retroreflector. A retroreflector element may be made of 3 mirrors positioned with an angle of 90 degrees between each other, or may be a sphere with a particular index of refraction. If the ray travels in the air, the index of refraction of the sphere must be equal to 2. The light source 101 must be placed close to the imaging device 1104 in order to allow the light to retro-reflect on the imaging device. By applying the same computation method as described above in this description, it will result in the position of a virtual light source 1102. The retroreflector position being the middle point between the computed virtual light source position 1102, and physical light source position 101, it is thus straightforward to compute the retroreflector position from the virtual light source position.

In another embodiment of the invention, the system measures the three dimensional position of two retroreflectors 1203 and 1213 reflecting light at distinct wavelengths, by using two filters, as shown in FIG. 9. One of said filters is opaque at the wavelengths of one retroreflector, and transparent at the wavelength of the other retroreflector, and vice versa for the other of said filters. The filters must be matched to the retroreflector wavelengths. In other words, the first filter must be transparent at the reflection wavelength of the first retroreflector 1203 and opaque at the reflection wavelength of the second retroreflector 1213. The filters are arranged so as to cover distinct locations of the component, and in that each filter covers a surface, which is at least as big as nine times the surface of a single pattern of the component. By "filter" we refer to the optical property of the material that embodies the surface used for filtering the light. According to this definition, we can place the same filter on different distinct location of the sensor. This embodiment can either use a single light source that emits at several wavelengths, or two light sources whose wavelength are matched to the retroreflectors and to the filters. The method can be extended to more than two retroreflectors.

Figure 13:
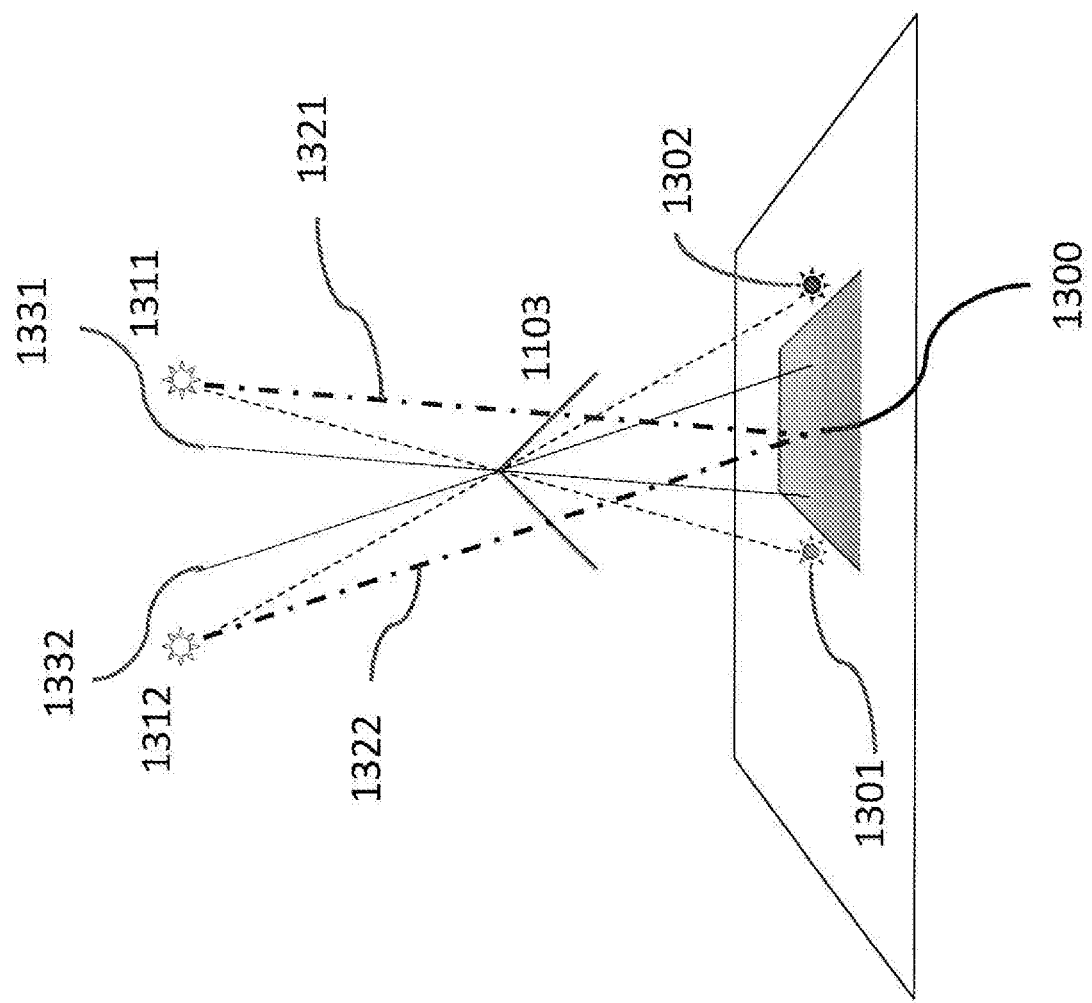
FIG. 13 shows the computation of the three-dimensional position of a retroreflector using two light sources with different wavelengths.
Figure 14:
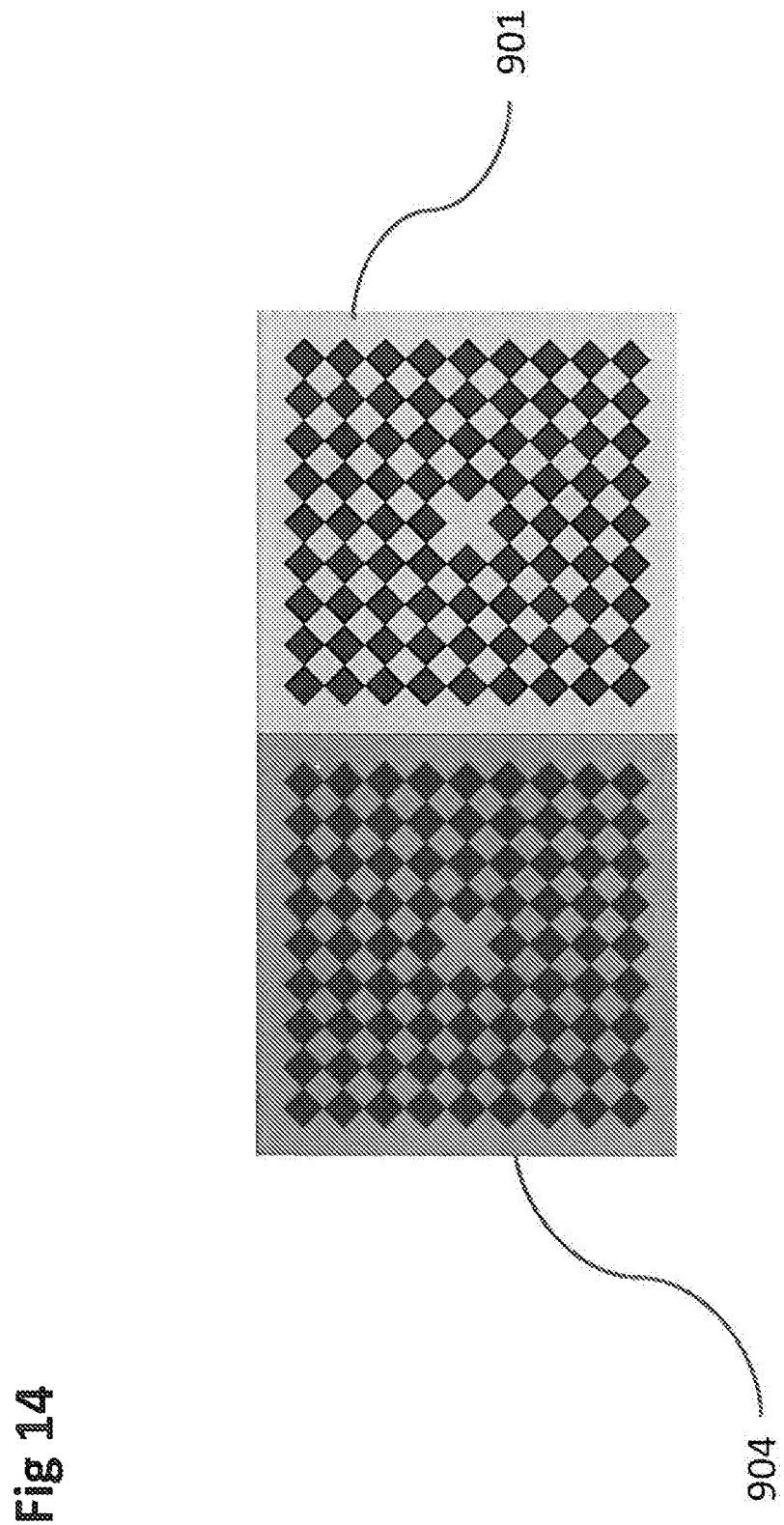
FIG. 14 shows use of filters to compute the position of the retroreflector of FIG. 13.

In another embodiment of the invention, the system measures the three dimensional position of one retroreflector 1103, by using two filters, as shown in FIG. 14, and two light sources 1301 and 1302 connected to the computing means and to the imaging device, as shown in FIG. 13. One of said filters is opaque at the wavelengths of one light source 1301, and transparent at the wavelength of the other light source 1302, and vice versa for the other of said filter. The filters are arranged so as to cover distinct locations of the component, and in that each filter covers a surface, which is at least as big as nine times the surface of a single pattern of the component. By "filter" we refer to the optical property of the material that embodies the surface used for filtering the light. The elevations values of the virtual light source 1312 are computed using the image under the filter 901, which define a line 1322 in space where said virtual light source is located. Since the retroreflector is located half way in-between the light source and its virtual counterpart, the retroreflector is located on line 1332, which is parallel to line 1322 and half way between the location of the elevation measurements 1300, and the location of the light source 1302. Using a similar reasoning, the retroreflector is located on line 1331, which is parallel to line 1321 that defines the position of the virtual light source 1311. Thus, the retroreflector three dimensional position is obtained by intersecting lines 1331 and 1332. If they don't intersect, the closest point to the two lines is chosen. The distance between light sources 1301 and 1302 influences the precision of the measurement height of the retroreflector. On the one hand, these light sources must be close to the imaging device in order to receive some light from the retroreflector, and on the other hand, these light sources would be conveniently placed far away from each other to get the best measurement height precision. To get the optimal precision, a first measurement by using the light sources 1301 and 1302 close to the imaging device is performed, followed by a measurement with these light sources placed further away. If the retroreflector is close, then the light source must be close to the imaging device, otherwise not enough light will be reflected on the imaging device. If the retroreflector is far, the light source can be placed further from the imaging device, and still reflect some light on the imaging device. In practice, instead of displacing the light sources, the light sources are duplicated on the sensor resulting in several identical copies of each light source positioned at increasing distance from the imaging device. FIG. 15 shows the light source 1301 duplicated as source 1511 and 1521, and the light source 1302 duplicated as source 1512 and 1522. A displacement of the light sources is equivalent to turning off light sources 1301 and 1302, and turning on light sources 1511 and 1512. The light sources must be addressable individually by the computing means in order to turn them on and off in the way just described.

By computing the three dimensional position of several light sources, or several retroreflectors in space, it is straightforward to compute the position of an object with several degrees of freedom if the light sources or the retroreflectors are part of that object. For example, if three light sources are placed on a single object, then the six degrees of freedom—the position and the orientation in space—of that object can be easily computed. This procedure can be extended to an arbitrary number of degrees of freedom provided the adequate number of light sources. A well known example is the computation of the six degrees of freedom of an object using four light sources placed on a planar surface of that object: the six degrees of freedom of that object can be computed from the elevation values of the light sources—or equivalently from the (x,y) locations of their shadow—as described in R. Hartley and A. Zissermann, "Multiple View Geometry in Computer Vision", second edition, Cambridge university press, 2003, section 8.1.1.

In conclusion, a component that casts a shadow on an imager is used to estimation the elevation of a light source in space. When there are multiple shadows, the three-dimensional position of the light source can be computed. If the component contains repetitive patterns, the shadow position can be computed with a precision that reaches a small fraction of the wavelength of the light. If the pattern is aligned with the lines and columns of the imaging device, the computation can be performed from the sum over the lines and the sum over the columns of the pixel values, thus saving a substantial amount of computation and memory consumption. The perturbation of other lights in the environment can be reduced by using a proper modulation of the light, or by using colour filters, or by using both. The estimation of the position of several lights in the scene can be computed by using a temporal multiplexed code, or by using distinct wavelengths and matched filters on top of the imaging device. To get better precision in the estimation of the third dimension, i.e. the distance from the light source to the sensor, two imaging devices with two elements can be used, and must be placed with a substantial distance between them. To have a system with only one active component, the light source can be replaced by a retroreflector and by placing a second light source close to the imaging device. In this setup the retroreflector needs no power supply, in contrast with the light source it replaces. In addition, the synchronisation of the second light source with the imaging device is greatly simplified thanks to a direct connection between the two elements. The setup with the retroreflector can also be implemented using two light sources, with two matched filters. The distance between the light sources determines the precision of the estimation of the third dimension. Finally, the distance between said two light sources can be increased to increase the third dimension precision.

This description has been provided only for purpose of non limiting example. Those skilled in the art may adapt the invention but keeping within the scope of the invention as defined in the claims.

The invention claimed is:

1. A measurement system comprising,
   at least one imaging device composed of a plurality of sensitive pixels disposed in at least one dimension;
   at least one punctual light source;
   at least one component configured to cast a shadow on the imaging device, the position of the component being fixed with respect to the imaging device, the component being composed of repetitive patterns realized on a planar surface including a distinctive element, the component being configured to cast a shadow made of repetitive patterns and made of a distinctive element, the imaging device being configured to record an image of said shadow; and
   computation means;
   wherein the repetitive patterns are repeated at regular space intervals, and the computation means is configured to compute the elevation of the light source from the position of the distinctive element present in said image, and
   wherein the computation means is configured to modify the computed elevation of the light source from the position of the repetitive patterns present in said image.

2. The measurement system of claim 1, wherein the component patterns are made of microlenses, and
   the distinctive element is a set of at least one missing microlens region.

3. The measurement system of claim 1, wherein the component is a grating composed of opaque repetitive patterns realized on a planar surface including a distinctive element.

4. The measurement system according to claim 1, further comprising M imaging devices and M components,
   wherein each component is attached between the light source and its respective imaging device,
   wherein the relative position between each imaging-component couple is fixed and defined,
   wherein M is an integer greater than or equal to two,
   wherein the imaging devices are not all coplanar, and
   wherein the computation means are designed to compute the three dimensional position of the light source.

5. The measurement system according to claim 1, wherein the imaging device is composed of a plurality of sensitive pixels disposed in two dimensions, and
   wherein the computation means are configured to compute the elevation along the first dimension and the elevation along the second dimension of the light source from the repetitive patterns and from the distinctive element present in said image.

6. The measurement system according to claim 5, wherein the computation of the elevation value along the first dimension or the elevation value along the second dimension, or both at the same time, uses at least 80% of said pixels that record said image of the shadow.

7. The measurement system according to claim 6, wherein the distinctive element is a two-dimensional code interlaced with the repetitive patterns, any squared subset of the code which contains at least three by three elements of the code being unique.

8. The measurement system according to claim 6, wherein the component is aligned to a pixel matrix of the pixels in such a manner that a sum of pixel values over lines of the image and a sum of pixels values over columns of said image defines the position of the shadow with respect to the component.

9. The measurement system of claim 6, further comprising at least two punctual light sources emitting light at distinct wavelengths and at least two filters,
   wherein the filters are configured to cover distinct locations of the component,
   wherein each filter covers a surface which is at least nine times the surface area of a single pattern of the component,
   wherein the filters are matched to the wavelengths of the light sources, and
   wherein the imaging device is designed to deliver one image per area covered by the filters.

10. The measurement system of claim 6, further comprising a retroreflector,
    wherein the light source is connected to the computing means and to the imaging device, and
    wherein the computation means are configured to compute the elevation of the retroreflector.

11. The measurement system of claim 10, further comprising at least two retroreflectors reflecting light at distinct wavelengths and at least two filters,
    wherein the filters are configured to cover distinct locations of the component,
    wherein each filter covers a surface which is at least nine times the surface area of a single pattern of the component,
    wherein the filters are matched to the reflecting wavelengths of the retroreflectors, and
    wherein the imaging device is configured to deliver one image per area covered by the filters.

12. The measurement system according to claim 10, further comprising at least two punctual light sources emitting light at distinct wavelengths and comprising at least two filters, wherein the filters are configured to cover distinct locations of the component, wherein each filter covers a surface which is at least nine times the surface area of a single pattern of the component, wherein the filters are matched to the wavelengths of the light sources, wherein the imaging device is configured to deliver one image per area covered by the filters, and wherein every light source is connected to the computing means and to the imaging device.

13. The measurement system of claim 12, further comprising several identical copies of said light sources, wherein every light source is addressable individually, and said copies of the light sources are positioned at increasing distance from the imaging device.

14. The measurement system of claim 6, wherein the computation means are configured so that the elevation along both dimensions are defined in at least two distinct locations of the same imaging device, and so that the combination of all said elevations defines the three-dimensional position of the punctual light source.

15. The measurement system of claim 6, comprising N imaging devices and N components, wherein each component is attached between the light source and its respective imaging device, wherein the relative position between each imaging-component couple is fixed and defined, wherein N is an integer greater than or equal to two, and wherein the computation means are designed to compute the three dimensional position of the light source.

16. The measurement system of claim 6, further comprising control means arranged to switch the light source(s) on-and-off according to a predefined timed sequence.

17. The measurement system of claim 6, further comprising a modulation circuit configured to modulate the power of the light in a repetitive manner.

18. A method for the measurement of the position of a light source, for implementing a measurement system including at least one imaging device composed of a plurality of sensitive pixels disposed in at least one dimension, at least one punctual light source, at least one component configured to cast a shadow on the imaging device, the position of the component being fixed with respect to the imaging device, the component being composed of repetitive patterns realized on a planar surface including a distinctive element, the component being configured to cast a shadow made of repetitive patterns and made of a distinctive element, and computation means, the method comprising:

recording, by the imaging device, the image of the shadow; and computing, using the image of the shadow, the position of the shadow with respect to the component, wherein the repetitive patterns are repeated at regular space intervals, the computation means are configured to compute the elevation of the light source from the position of the distinctive element present in said image, the computation means being configured to modify the computed elevation of the light source from the position of the repetitive patterns present in said image, the imaging device is composed of a plurality of sensitive pixels disposed in two dimensions, the computation means are configured to compute the elevation along the first dimension and the elevation along the second dimension of the light source from the repetitive patterns and from the distinctive element present in said image, the computation of the elevation value along the first dimension or the elevation value along the second dimension, or both at the same time, uses at least 80% of said pixels that record said image of the shadow, and the elevation of the light source or of a retroreflector along the first dimension and along the second dimension of the imaging device is computed using the position of the shadow.

19. The measurement method of claim 18, wherein the position of the shadow of the component is obtained as the sum of an approximate position value computed from the distinctive element and a phase position value computed from the repetitive patterns.

20. The measurement method of claim 19, wherein the position of the shadow of the component is computed from a sum of pixel values over the lines of the image and from a sum of pixel values over the columns of the image of the shadow.

21. The measurement method of claim 18, wherein the position of the shadow of the component is computed from a sum of pixel values over the lines of the image and from a sum of pixel values over the columns of the image of the shadow.

22. The measurement method according to claim 18, wherein the position of the shadow with respect to the component is computed in at least two distinct locations of the imaging device, and the combination of said positions is used to compute the three-dimensional position of the light source or of the retroreflector.

23. The measurement method according to claim 18, wherein, the measurement method is for implementing a measurement system that further comprises a modulation circuit configured to modulate the power of light in a repetitive manner, the method further comprising:

modulating, by the modulation circuit, the intensity of the light source;

recording the image of the shadow at least twice;

combining said recorded images to deliver a new image of the shadow, the combining the recorded images cancelling the effect on said new image of any other light source present in the measurement system environment and whose modulation differs from the light source modulated by said modulation circuit; and computing the position of the shadow with respect to the component from said new image of the shadow.

24. The measurement method according to claim 18, wherein, the measurement method is for implementing a measurement system that further comprises:

(i) a retroreflector, the light source being connected to the computing means and to the imaging device, the computation means being designed to compute the elevation of the retroreflector, (ii) at least two punctual light sources emitting light at distinct wavelengths, and (iii) at least two filters, the filters being configured to cover distinct locations of the component, each filter covering a surface which is at least as big as nine times the surface of a single pattern of the component, the filters being matched to the wavelengths of the light sources, the imaging device being configured to deliver one image per area covered by the filters, every light source being connected to the computing means and to the imaging device; and the method further comprising
- computing the position of the shadow with respect to the component at least once per area covered by the filters, and
- computing, using the positions computed at least one per area covered by the filters, the three-dimensional position of the retroreflector.

25. The measurement method according to claim 24, wherein, the measurement method is for implementing a measurement system that further comprises several identical copies of said light sources, every light source being addressable individually, said copies of the light sources being positioned at increasing distance from the imaging device, and
- the position of the three-dimensional position of the retroreflector is first computed using a light first source and a second light source that are close to the sensor, followed by a computation using a copy of light the first light source and a copy of the second light source that are positioned further apart from the sensor.

* * * * *